(12) United States Patent
Lee et al.

(10) Patent No.: US 10,289,893 B2
(45) Date of Patent: May 14, 2019

(54) FINGERPRINT IDENTIFICATION APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH-CORPORATION, New Taipei (TW)

( * ) Notice: Subject to any disclaimer, the term of this patent is extended or adjusted under 35 U.S.C. 154(b) by 21 days.

(21) Appl. No.: 15/368,113

(22) Filed: Dec. 2, 2016

(65) Prior Publication Data

US 2017/0193273 A1    Jul. 6, 2017

(30) Foreign Application Priority Data

Dec. 31, 2015 (TW) .............................. 104144629 A (51) Int. Cl.
*G06K 9/00* (2006.01)

(52) U.S. Cl.
CPC ....... *G06K 9/00087* (2013.01); *G06K 9/0002* (2013.01); *G06K 9/00053* (2013.01)

(58) Field of Classification Search
CPC ........... G06K 9/00087; G06K 9/00053; G06K 9/0002
See application file for complete search history.

(56) References Cited

U.S. PATENT DOCUMENTS

| 2013/0201155 | A1  | 8/2013  | Wu  | |
|---|---|---|---|---|
| 2015/0294135 | A1* | 10/2015 | Kim | H01L 23/04 382/124 |
| 2016/0247009 | A1* | 8/2016  | Lu  | G06K 9/00 |

FOREIGN PATENT DOCUMENTS

| TW | 201447711 A | 12/2014 |
|---|---|---|
| TW | M513407 U   | 12/2015 |

OTHER PUBLICATIONS

Office Action dated Dec. 19, 2016 of the corresponding Taiwan patent application.

* cited by examiner

*Primary Examiner* — Ruiping Li
(74) *Attorney, Agent, or Firm* — Chun-Ming Shih; HDLS IPR Services (57) ABSTRACT

A fingerprint identification apparatus includes a fingerprint identification IC chip having a contact face and a plurality of metal bumps arranged on the contact face, a thin substrate having a first face, a second face opposite to the first face and a plurality of metal pads arranged on the first face, wherein at least part of the metal pads electrically connect with the metal bumps, a protection layer having a mounting face adjacent to the second face of the thin substrate, and a plurality of conductive electrodes arranged between the thin substrate and the protection layer. The metal bumps are not directly pressed or press-soldered to the protection layer, thus preventing the transparent conductive traces of the protection layer from damaging and enhancing the package yield.

20 Claims, 5 Drawing Sheets

FINGERPRINT IDENTIFICATION APPARATUS

BACKGROUND OF THE INVENTION

Field of the Invention

The present invention relates to a fingerprint identification apparatus, especially to a fingerprint identification apparatus having low cost and high packaging yield.

Description of Prior Art

Biometric recognition technologies have rapid development due to the strong request from electronic security applications and automatic access control system. The biometric recognition technologies can be classified into fingerprint recognition, iris recognition and DNA recognition and so on. For the considerations of efficiency, safety and non-invasiveness, the fingerprint recognition becomes main stream technology. The fingerprint recognition device can scan fingerprint image by optical scanning, thermal imaging or capacitive imaging. For cost, power-saving, reliability and security concerns, the capacitive fingerprint sensor becomes popular for biometric recognition technology applied to portable electronic devices.

The conventional capacitive fingerprint sensors can be classified into swipe type and area type (pressing type), and the area type has better identification correctness, efficiency and convenience. However, the area type capacitive fingerprint sensor generally integrates the sensing electrodes and the sensing circuit into one integrated circuit (IC) because the sensed signals are minute and the background noise is huge in comparison with the minute sensed signals. In conventional area type technique, holes are defined on the protection glass of the display to arrange the fingerprint identification IC chip therein and sapphire film is used to cover and protect the fingerprint identification IC chip. Through-silicon via (TSV) technique is used to lead the conductive wires to backside of the fingerprint identification IC chip. As a result, the material cost and package cost is high while the yield is influenced. There are development trends to simply the package the fingerprint identification IC chip and to enhance the sensing ability. The fingerprint identification IC chip is desirably packaged under the protection glass to reduce cost and enhance product lifetime/durability.

SUMMARY OF THE INVENTION

It is an object of the present invention to provide a fingerprint identification apparatus having low cost and high packaging yield.

Accordingly, the present invention provides a fingerprint identification apparatus comprising:

a fingerprint identification IC chip having a contact face and a plurality of metal bumps arranged on the contact face; a thin substrate having a first face, a second face opposite to the first face and a plurality of metal pads arranged on the first face, wherein at least part of the metal pads electrically connect with the metal bumps; a protection layer having a mounting face adjacent to the second face of the thin substrate, and a plurality of conductive electrodes arranged between the thin substrate and the protection layer.

In one aspect of the present invention, the fingerprint identification apparatus in further comprises a flexible circuit board electrically connected to the thin substrate.

In another aspect of the present invention, the at least part of the metal pads on the thin substrate and the metal bumps of the fingerprint identification IC chip are in one by one correspondence.

In still another aspect of the present invention, the conductive electrodes are arranged on the mounting face of the protection layer, and the at least part of the metal pads on the thin substrate and the conductive electrodes on the protection layer are in one by one correspondence.

In still another aspect of the present invention, the thin substrate is glued to the protection layer.

In still another aspect of the present invention, the fingerprint identification IC chip is pressed on the thin substrate through anisotropic conductive film (ACF), or the fingerprint identification IC chip is pressure soldered on the thin substrate through a low melting point metal material.

In still another aspect of the present invention, the protection layer is a protection glass of a display or a thin film transistor substrate for a display.

In still another aspect of the present invention, the protection layer is made from glass, ceramic, sapphire or polymer material.

In still another aspect of the present invention, the thin substrate is polymer firm substrate.

In still another aspect of the present invention, the fingerprint identification IC chip further comprises a fingerprint identification circuit and the fingerprint identification circuit comprises at least one self-capacitance sensing circuit.

In still another aspect of the present invention, the thin substrate has thickness between 10 to 100 micrometers.

Accordingly, the present invention provides a fingerprint identification apparatus comprising:

a fingerprint identification IC chip having a contact face and a plurality of metal bumps arranged on the contact face; an intermediate layer having a first face, a second face opposite to the first face and a plurality of metal pads arranged on the first face and the second face respectively, the metal pads on the first face and the metal pads on the second face being one by one correspondence and electrically connected by corresponding metal pillars, wherein at least part of the metal pads on the first face of the intermediate layer electrically connected to the metal bumps; and a protection layer having a mounting face adjacent to the second face of the intermediate layer.

In one aspect of the present invention, the fingerprint identification apparatus in further comprises a flexible circuit board electrically connected to the thin substrate.

In another aspect of the present invention, the at least part of the metal pads on the first face of the intermediate layer and the metal bumps of the fingerprint identification IC chip are in one by one correspondence.

In still another aspect of the present invention, the protection layer has a plurality of conductive electrodes on the mounting face, at least part of the metal pads on the second face of the intermediate layer and the conductive electrodes are in one by one correspondence.

In still another aspect of the present invention, the fingerprint identification IC chip is pressed on the intermediate layer through anisotropic conductive film (ACF), or the fingerprint identification IC chip is pressure soldered on the intermediate layer through a low melting point metal material.

In still another aspect of the present invention, the protection layer is a protection glass of a display.

In still another aspect of the present invention, the protection layer is made from glass, ceramic, sapphire or polymer material.

In still another aspect of the present invention, the fingerprint identification IC chip further comprises a fingerprint identification circuit and the fingerprint identification circuit comprises at least one self-capacitance sensing circuit.

By above-mentioned fingerprint identification apparatus, the fingerprint identification IC chip is assembled with the protection thin substrate or an intermediate layer, whereby the cost of the fingerprint identification apparatus is reduced and the yield of the fingerprint identification apparatus is enhanced.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
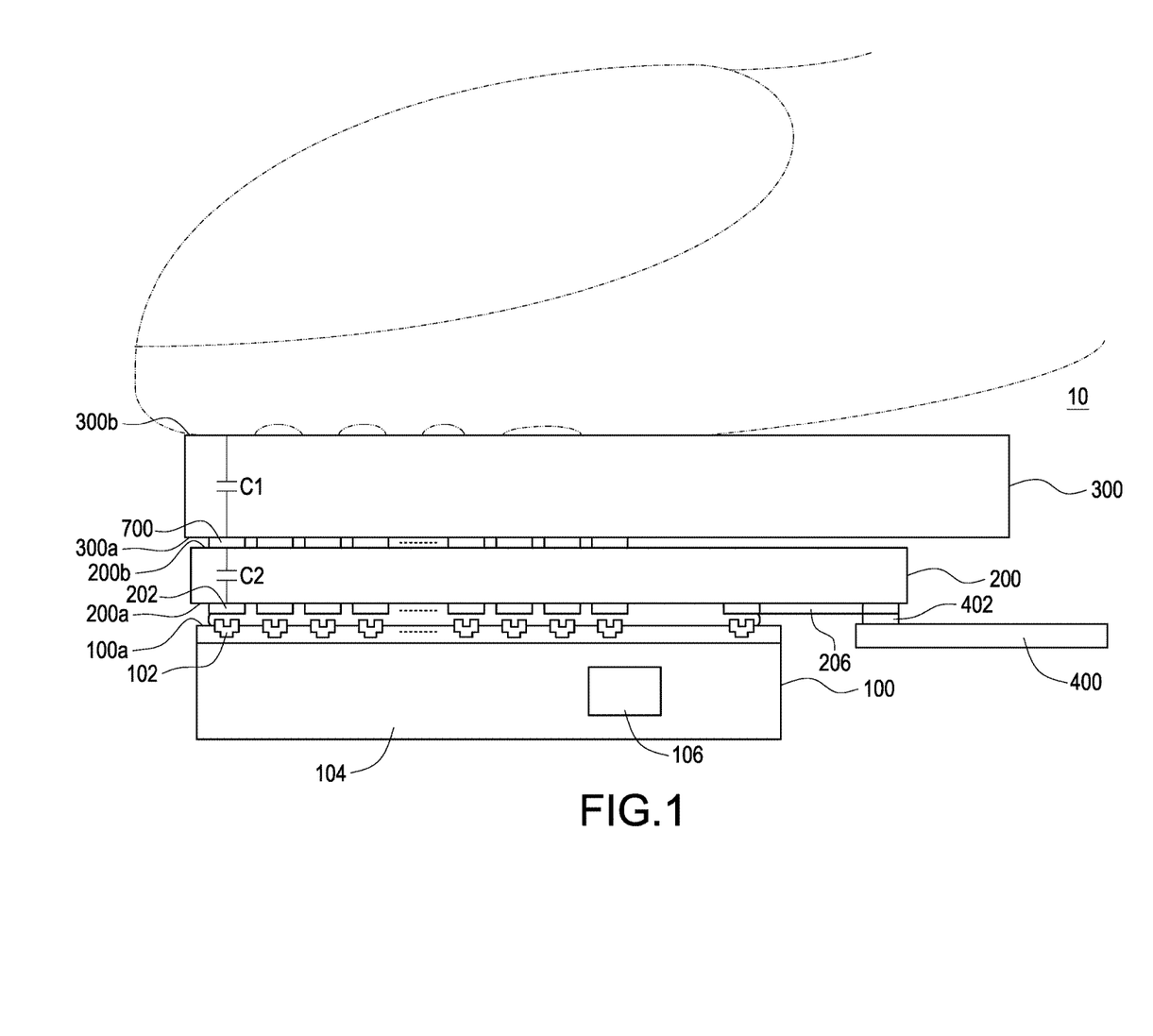
FIG. 1 is a schematic diagram showing the fingerprint identification apparatus according to the first embodiment of the present invention.

FIG. 1 is a schematic diagram showing the fingerprint identification apparatus 10 according to the first embodiment of the present invention. The fingerprint identification apparatus 10 of the present invention is applied to bio-identifying technology. The fingerprint identification apparatus 10 comprises a fingerprint identification IC chip 100, a thin substrate 200, a protection layer 300 and a plurality of conductive electrodes 700. The fingerprint identification IC chip 100 comprises a contact face 100a, a plurality of metal bumps 102, a fingerprint identification circuit 104 and a self-capacitance sensing circuit 106, where the metal bumps 102 are arranged on the contact face 100a of the fingerprint identification IC chip 100. The thin substrate 200 comprises a first face 200a, a second face 200b opposite to the first face 200a, and a plurality of metal pads 202, where the metal pads 202 are arranged on the first face 200a. The protection layer 300 comprises a mounting face 300a, and an operative face 300b opposite to the mounting face 300a, where the mounting face 300a of the protection layer 300 is adjacent to the second face 200b of the thin substrate 200. The conductive electrodes 700 are arranged between the thin substrate 200 and the protection layer 300. As shown in FIG. 1, the user finger is operated on the operative face 300b of the protection layer 300.

At least part of the metal pads 202 on the first face 200a of the thin substrate 200 are electrically connected to the metal bumps 102 of the fingerprint identification IC chip 100. For example, the fingerprint identification IC chip 100 may be arranged on the thin substrate 200 through anisotropic conductive film (ACF) to achieve above electrical connection. Besides, the fingerprint identification IC chip 100 may be soldered on the thin substrate 200 through pressure soldering of a low melting point metal material to achieve electrical connection between part of the metal pads 202 and the corresponding metal bumps 102. Moreover, the metal bumps 102 and part of the metal pads 202 are in one by one correspondence (one by one relationship) with respect to their locations. Another part of the metal pads 202 can be electrically connected to metal pads 402 on a flexible circuit board 400 such that the fingerprint identification signal generated by the fingerprint identification IC chip 100 can be sent to the flexible circuit board 400 through the thin substrate 200 for further processing. As shown in FIG. 1, the metal pads 402 of the flexible circuit board 400 can be electrically connected to the fingerprint identification IC chip 100 through the metal pad 202 and the conductive trace 206 of the thin substrate 200. The fingerprint identification IC chip 100 further comprises a fingerprint identification circuit 104, which comprises a self-capacitance sensing circuit 106. The detail of the self-capacitance sensing circuit 106 can be referred to U.S. Pat. No. 8,704,539 (corresponding to Taiwan patent No. I473001) filed by the same applicant. Part of the description for the self-capacitance sensing circuit 106 will also be made later with reference to FIG. 3. The thin substrate 200 is ultra-thin substrate with thickness between 10 to 100 micrometers and can be, for example, a polymer thin film substrate.

The protection layer 300 is faced down and attached to (for example, glued by optical glue) a surface of the thin substrate 200, namely, the mounting face 300a of the protection layer 300 is attached to the second face 200b of the thin substrate 200 such that the signal transmission between the protection layer 300 and the fingerprint identification IC chip 100 can be made through the thin substrate 200. More particularly, the conductive electrodes 700 and above-mentioned part of the metal pads 202 (those having electrical connection with the metal bumps 102) are in one by one correspondence with respect to their locations. In this embodiment, the conductive electrodes 700 may be arranged on the mounting face 300a of the protection layer 300 or on the second face 200b of the thin substrate 200. When the user finger is pressed on (or in proximity to) the operative face 300b of the protection layer 300, a first capacitor C1 is formed between a contact point of user finger and the corresponding conductive electrode 700; while a second capacitor C2 is formed between the corresponding conductive electrode 700 and the metal pad 202 related to the corresponding conductive electrode 700 as shown in FIG. 1. The thickness of the thin substrate 200 is far less than the thickness of the protection layer 300 such that the capacitance of the second capacitor C2 is far larger than the capacitance of the first capacitor C1. Therefore, the capacitance of the serially connected first capacitor C1 and second capacitor C2 is almost the same as the capacitance of the first capacitor C1 alone. The insertion of the thin substrate 200 between the protection layer 300 and the fingerprint identification IC chip 100 will not influence the precision of fingerprint identification. In the present invention, the metal bumps 102 of the fingerprint identification IC chip 100 are attached to the thin substrate 200 through anisotropic conductive film (ACF), or soldered on the thin substrate 200 through pressure soldering of a low melting point metal material. Afterward, the thin substrate 200 is attached to the protection layer 300. Namely, the fingerprint identification IC chip 100 is not directly attached to or soldered to the protection layer 300. When the protection layer 300 is a protection glass of a display, the arrangement of the fingerprint identification IC chip 100 will not damage the transparent wiring (such as ITO) on the mounting face 300a of the protection layer 300. Besides being the protection glass of a display, the protection layer 300 may be thin film transistor substrate. In other embodiments, the protection layer 300 may be anti-scratch film or membrane (such as film or membrane made from glass, ceramic, sapphire or polymer material) with size larger enough to cover the fingerprint identification IC chip 100.

Figure 2:
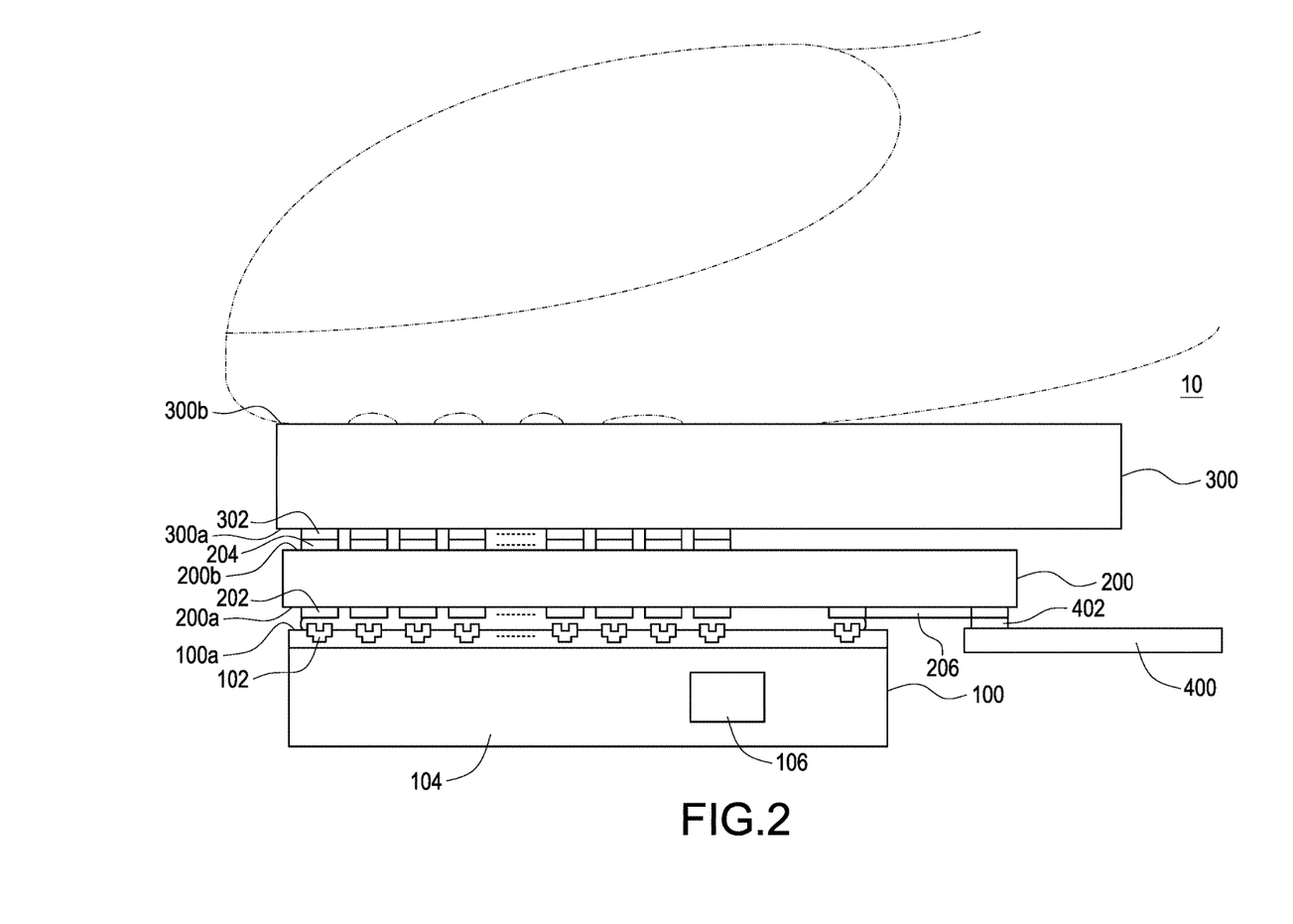
FIG. 2 shows is a schematic diagram showing the fingerprint identification apparatus according to the second embodiment of the present invention.

FIG. 2 shows is a schematic diagram showing the fingerprint identification apparatus 10 according to the second embodiment of the present invention. The embodiment shown in FIG. 2 is similar to that shown in FIG. 1 except that the thin substrate 200 of the fingerprint identification apparatus 10 further comprises a plurality of metal pads 204. At this time, the conductive electrodes 302 are arranged on the protection layer 300. More particularly, the metal pads 204 are arranged on the second face 200b of the thin substrate 200 while the conductive electrodes 302 are arranged on the mounting face 300a of the protection layer 300. The metal pads 204 and the conductive electrodes 302 are in one by one correspondence with respect to their locations. Moreover, the metal pads 204 also have one by one correspondence with part of the metal pads 202 with respect to their locations and have one by one correspondence with part of the metal bumps 102 with respect to their locations. Namely, the mounting face 300a is attached to the metal pads 204 on second face 200b of the thin substrate 200. Similarly, the embodiment in FIG. 2 also has the advantages of simple package to arrange the fingerprint identification IC chip 100 below the protection layer 300. In other embodiments, the conductive electrodes 302 may be dispensed with, and the protection layer 300 can be alternatively formed on the second face 200b of the thin substrate 200 by coating or deposition (such as physical deposition).

Figure 3:
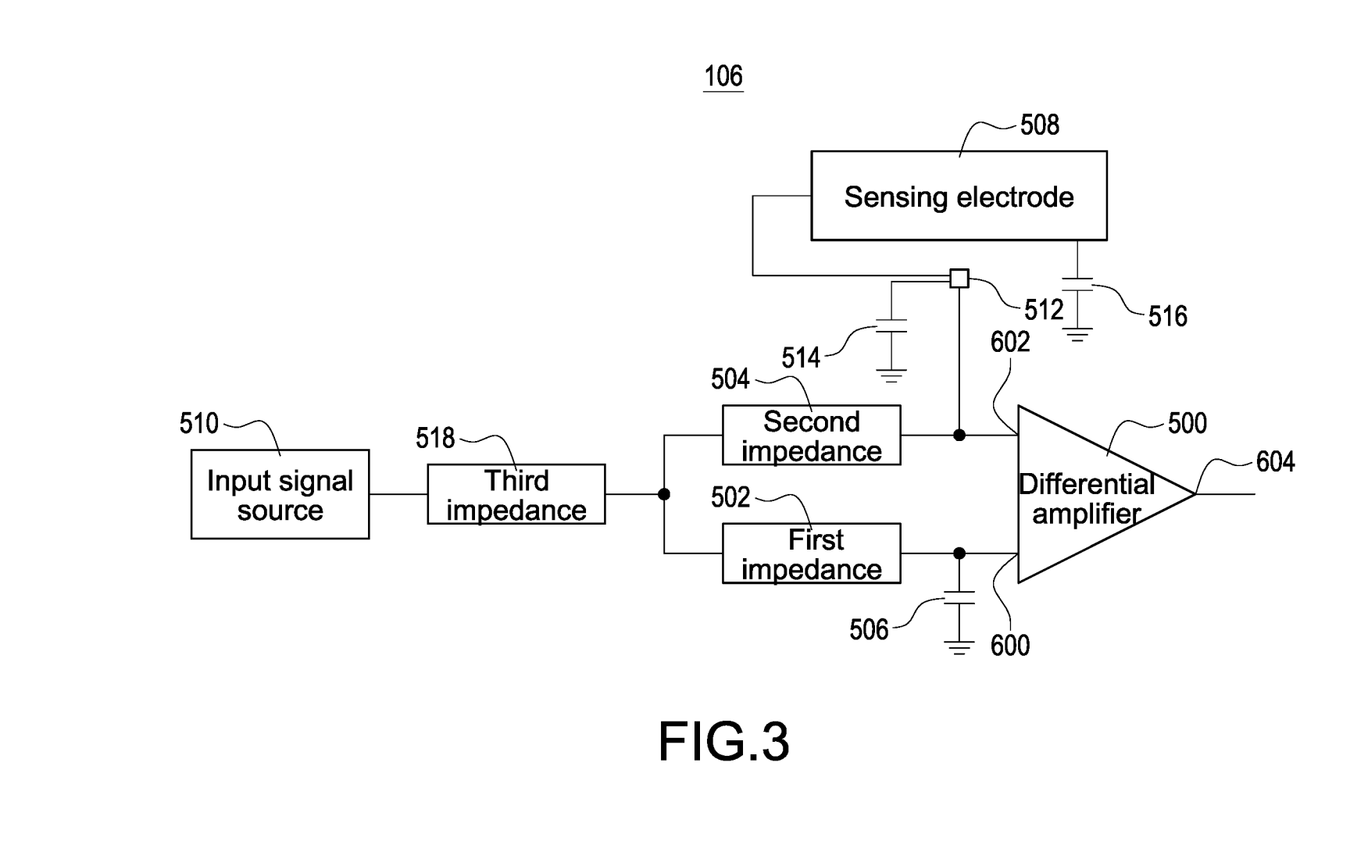
FIG. 3 shows the circuit diagram of the self-capacitance sensing circuit according to an embodiment of the present invention.

FIG. 3 shows the circuit diagram of the self-capacitance sensing circuit according to an embodiment of the present invention. The self-capacitance sensing circuit 160 mainly comprises a differential amplifier 500, a first impedance 502, a second impedance 504, a first capacitor 506, a sensing electrode 508, an input signal source 510, a first stray capacitance 514, a second stray capacitance 516 and a third impedance 518. The differential amplifier 500 has a first input end 600, a second input end 602 and an output end 604.

The input signal source 510 is electrically coupled with the third impedance 518. The third impedance 518 is electrically coupled with the first impedance 502 and the second impedance 504. The first impedance 502 is electrically coupled with the first capacitor 506 and the first capacitor 506 is electrically coupled with the first input end 600 of the differential amplifier 500. The second impedance 504 is electrically coupled with the second input end 602 of the differential amplifier 500. The sensing electrode 508 is electrically coupled to the second impedance 504 and the second input end 602 through an IC pin 512 of the self-capacitance sensing circuit 160. The first stray capacitance 514 is electrically coupled to the IC pin 512 and the second stray capacitance 516 is electrically coupled to the sensing electrode 508. In the self-capacitance sensing circuit 160 shown in FIG. 3, the sensing electrode 508 receives a touch signal when a finger or a conductor is touched thereon. The input signal source 510 is a periodical signal and sent to the first impedance 502 and the second impedance 504 through the third impedance 518. Due to the equivalence of the resistance values for the first impedance 502 and the second impedance 504, the differential amplifier 500 will generate a differential touch signal after receiving the input signal source 510 and the touch signal from the sensing electrode 508. In this embodiment, the capacitance of the first capacitor 506 is equal to the resulting capacitance of the first stray capacitance 514 in parallel connection with the second stray capacitance 516. The capacitance of the second stray capacitance 516 changes when user finger approaches or touches the sensing electrode 508. Therefore, the voltages fed to the first input end 600 and the second input end 602 will be different such that the differential amplifier 500 has a (non-zero) differential output at the output end 604. In this way, the minute capacitance change on the sensing electrode 508 can be detected by the differential amplifier 500. Moreover, the noise from circuits or power source can be advantageously removed.

Figure 4:
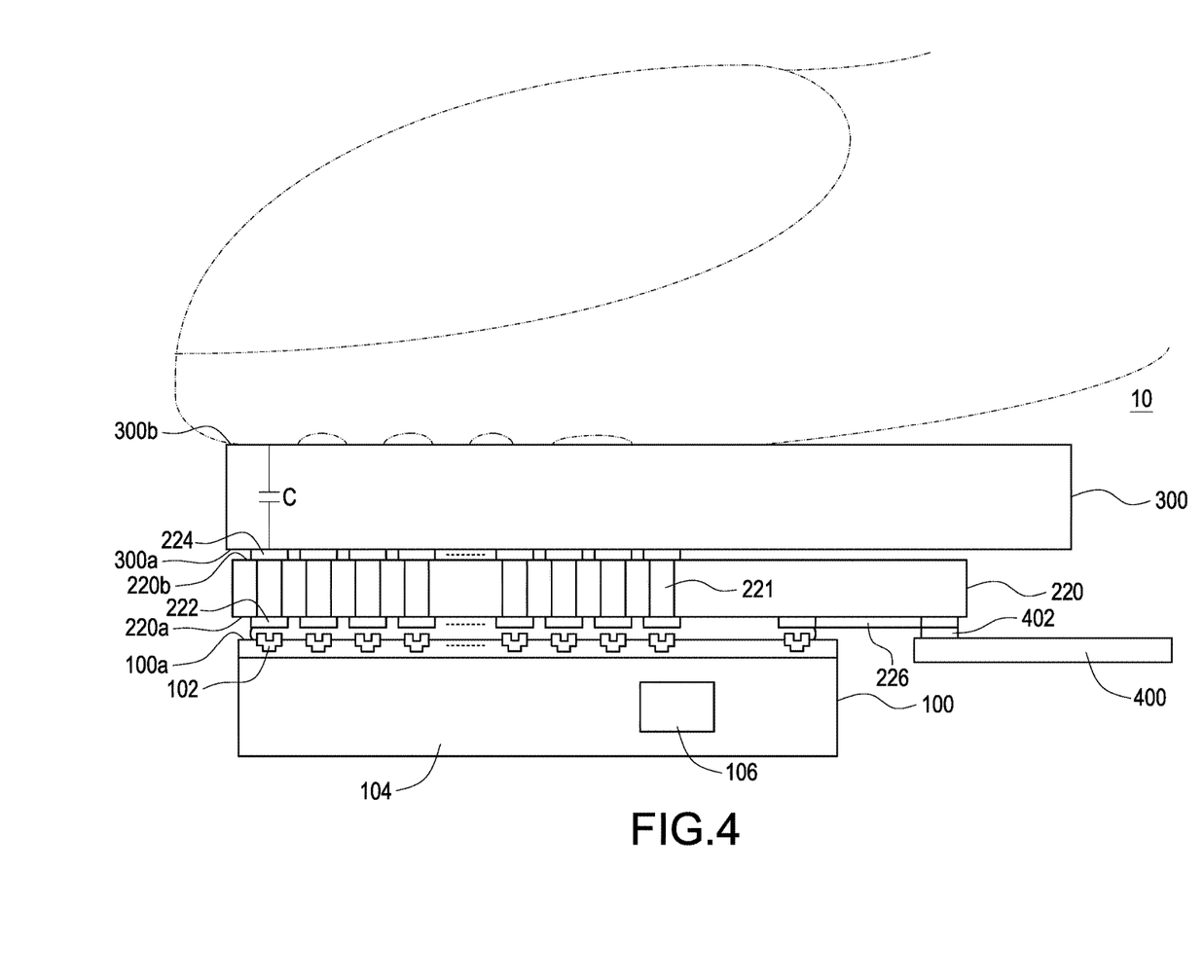
FIG. 4 is a schematic diagram showing the fingerprint identification apparatus according to the third embodiment of the present invention.

FIG. 4 is a schematic diagram showing the fingerprint identification apparatus 10 according to the third embodiment of the present invention. The fingerprint identification apparatus 10 of the present invention is applied to bio-identifying technology. The fingerprint identification apparatus 10 comprises a fingerprint identification IC chip 100, an intermediate layer 220 and a protection layer 300. The fingerprint identification IC chip 100 comprises a contact face 100a, a plurality of metal bumps 102, a fingerprint identification circuit 104 and a self-capacitance sensing circuit 106, where the metal bumps 102 are arranged on the contact face 100a of the fingerprint identification IC chip 100.

The intermediate layer 220 comprises a first face 220a, a second face 220b opposite to the first face 220a, a plurality of metal pillars 221 arranged between the first face 220a and the second face 220b, and a plurality of metal pads 222 and 224. The metal pads 222 are arranged on the first face 220a of the intermediate layer 220 and part of the metal pads 222 have one by one correspondence with the metal pillars 221. The metal pads 224 are arranged on the second face 220b of the intermediate layer 220 and have one by one correspondence with the metal pillars 221. The protection layer 300 comprises a mounting face 300a and an operative face 300b opposite to the mounting face 300a. As shown in FIG. 4, the user finger is operated on the operative face 300b of the protection layer 300.

As shown in FIG. 4, part of the metal pads 222 on the first face 220a of the intermediate layer 220 are electrically connected to the metal bumps 102 of the fingerprint identification IC chip 100. For example, the fingerprint identification IC chip 100 may be arranged on the intermediate layer 220 through anisotropic conductive film (ACF) to achieve above electrical connection. Besides, the fingerprint identification IC chip 100 may be soldered on the intermediate layer 220 through pressure soldering of a low melting point metal material to achieve electrical connection between part of the metal pads 222 and the corresponding metal bumps 102. Moreover, the metal bumps 102 and part of the metal pads 222 on the first face 220a of the intermediate layer 220 are in one by one correspondence (one by one relationship) with respect to their locations. Another part of the metal pads 222 on the first face 220a of the intermediate layer 220 can be electrically connected to metal pads 402 on a flexible circuit board 400 such that the fingerprint identification signal generated by the fingerprint identification IC chip 100 can be sent to the flexible circuit board 400 through the intermediate layer 220 for further processing. As shown in FIG. 4, the metal pads 402 of the flexible circuit board 400 can be electrically connected to the fingerprint identification IC chip 100 through the metal pad 222 and the conductive trace 226 of the intermediate layer 220. The fingerprint identification IC chip 100 further comprises a fingerprint identification circuit 104, which comprises a self-capacitance sensing circuit 106. The detail of the self-capacitance sensing circuit 106 can be referred to U.S. Pat. No. 8,704,539 (corresponding to Taiwan patent No. I473001) filed by the same applicant. Part of the description for the self-capacitance sensing circuit 106 will also be made later with reference to FIG. 3.

The protection layer 300 is faced down and attached to (for example, glued by optical glue) the second face 220b of the intermediate layer 220 or the protection layer 300 is formed on the second face 220b of the intermediate layer 220 by deposition or coating. Namely, the mounting face 300a of the protection layer 300 is attached to the second face 220b of the intermediate layer 220 such that the signal transmission between the protection layer 300 and the fingerprint identification IC chip 100 can be made through the intermediate layer 220. When the user finger is pressed on (or in proximity to) the operative face 300b of the protection layer 300, a capacitor C is formed between a contact point of user finger and the corresponding metal pad 224 on the second face 220b of the intermediate layer 220. The metal pad 224 and the corresponding metal pad 222 on opposite faces of the intermediate layer have direct signal connection due to the metal pillar 221. Therefore, the provision the intermediate layer 220 will not change the value of the capacitor C and will not influence the precision of fingerprint identification. In the present invention, the metal bumps 102 of the fingerprint identification IC chip 100 are attached to the intermediate layer 220 through anisotropic conductive film (ACF), or soldered on the intermediate layer 220 through pressure soldering. Afterward, the intermediate layer 220 is attached to the protection layer 300. Namely, the fingerprint identification IC chip 100 is not directly attached to or soldered to the protection layer 300. When the protection layer 300 is a protection glass of a display, the arrangement of the fingerprint identification IC chip 100 will not damage the transparent electrode (such as ITO) on the mounting face 300a of the protection layer 300. Besides being the protection glass of a display, the protection layer 300 may be thin film transistor substrate. In other embodiments, the protection layer 300 may be anti-scratch film or membrane (such as film or membrane made from glass, ceramic, sapphire or polymer material) with size larger enough to cover the fingerprint identification IC chip 100.

Figure 5:
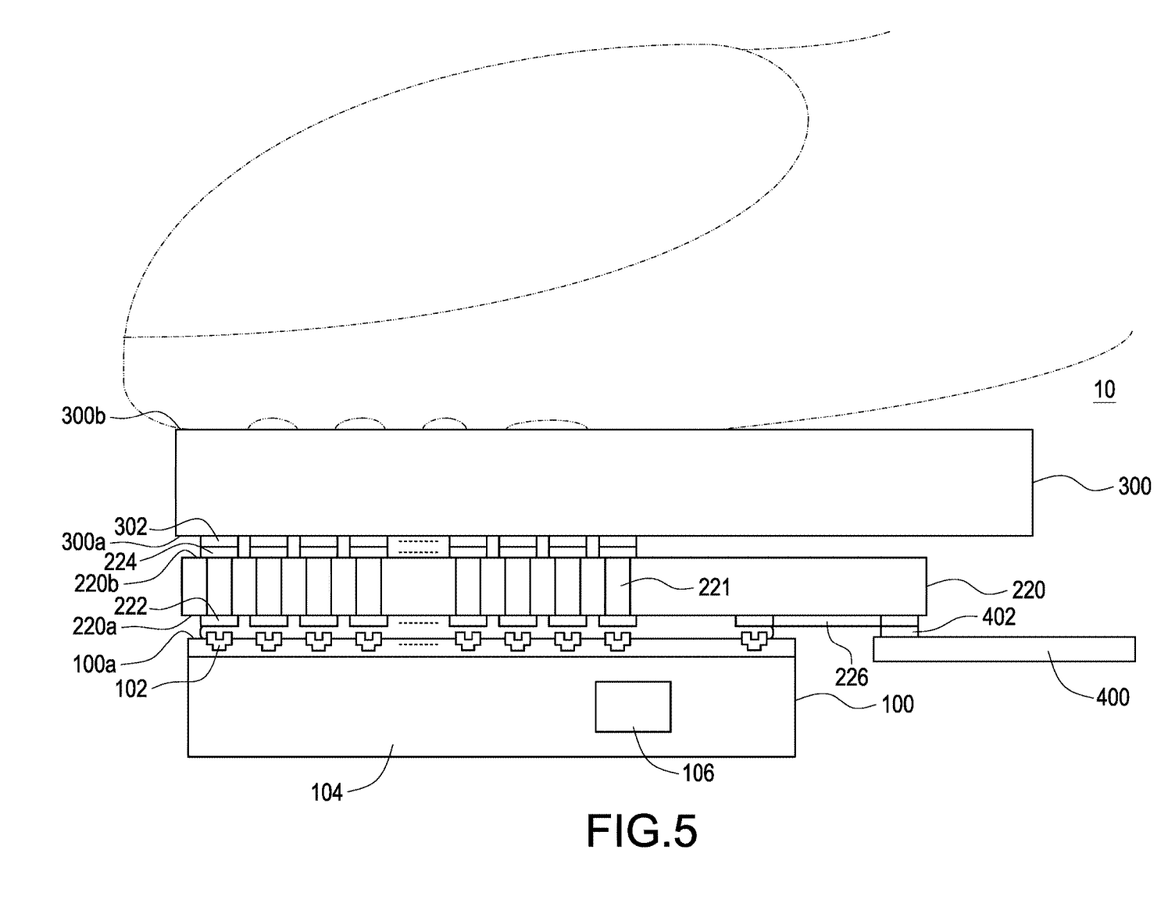
FIG. 5 is a schematic diagram showing the fingerprint identification apparatus according to the fourth embodiment of the present invention.

FIG. 5 is a schematic diagram showing the fingerprint identification apparatus 10 according to the fourth embodiment of the present invention. The embodiment shown in FIG. 5 is similar to that shown in FIG. 4 except that the protection layer 300 further comprises a plurality of conductive electrodes 302. The conductive electrodes 302 are arranged on the mounting face 300a of the protection layer 300 and have one by one correspondence with the metal pads 224 on the second face 220b of the intermediate layer 220 (with respect to their locations). When the user finger is pressed on (or in proximity to) the operative face 300b of the protection layer 300, a capacitor C is formed between a contact point of user finger and the corresponding conductive electrode 302 arranged on the mounting face 300a of the protection layer 300. The conductive electrode 302 and the corresponding metal pad 222 on bottom face of the intermediate layer 220 have direct signal connection due to the metal pillar 221. Therefore, the provision the intermediate layer 220 will not change the value of the capacitor C and will not influence the precision of fingerprint identification. Similarly, the embodiment in FIG. 5 also has the advantages of simple package to arrange the fingerprint identification IC chip 100 below the protection layer 300.

Thus, particular embodiments have been described. Other embodiments are within the scope of the following claims. For example, the actions recited in the claims may be performed in a different order and still achieve desirable results.

What is claimed is:

1. A fingerprint identification apparatus comprising:
a fingerprint identification IC chip having a contact face and a plurality of metal bumps arranged on the contact face;
a thin substrate having a first face, a second face opposite to the first face and a plurality of metal pads arranged on the first face, wherein at least part of the metal pads are electrically connected with the metal bumps;
a protection layer having a mounting face adjacent to the second face of the thin substrate, and
a plurality of conductive electrodes arranged between the thin substrate and the protection layer;
wherein the metal pads of the thin substrate are electrically insulated from the conductive electrodes;
wherein a thickness of the thin substrate is less than a thickness of the protection layer;
wherein the fingerprint identification IC chip is electrically insulated with the plurality of conductive electrodes;
wherein all of the plurality of metal bumps are arranged atop the contact face of the fingerprint identification IC chip;
wherein the conductive electrodes and the metal pads are arranged on opposite sides of the thin substrate;
wherein the metal bumps, the conductive electrodes and the metal pads are different electrodes, and are respectively arranged on three different layers;
wherein a separation between a bottom face of the fingerprint identification IC chip and the metal bumps is smaller than a separation between the bottom face of the fingerprint identification IC chip and the metal pads; the separation between the bottom face of the fingerprint identification IC chip and the metal pads is smaller than a separation between the bottom face of the fingerprint identification IC chip and the conductive electrodes.

2. The fingerprint identification apparatus in claim 1, further comprising:
a flexible circuit board electrically connected to the thin substrate.

3. The fingerprint identification apparatus in claim 1, wherein the at least part of the metal pads on the thin substrate and the metal bumps of the fingerprint identification IC chip are in one by one correspondence with respect to their locations.

4. The fingerprint identification apparatus in claim 3, wherein the conductive electrodes are arranged on the mounting face of the protection layer, and the at least part of the metal pads on the thin substrate and the conductive electrodes on the protection layer are in one by one correspondence with respect to their locations.

5. The fingerprint identification apparatus in claim 3, wherein the thin substrate is glued to the protection layer.

6. The fingerprint identification apparatus in claim 3, wherein the fingerprint identification IC chip is pressed on the thin substrate through anisotropic conductive film (ACF), or the fingerprint identification IC chip is pressure soldered on the thin substrate through a low melting point metal material.

7. The fingerprint identification apparatus in claim 1, wherein the protection layer is a protection glass of a display or a thin film transistor substrate for a display.

8. The fingerprint identification apparatus in claim 1, wherein the protection layer is made from glass, ceramic, sapphire or polymer material.

9. The fingerprint identification apparatus in claim 1, wherein the thin substrate is polymer film substrate.

10. The fingerprint identification apparatus in claim 1, wherein the fingerprint identification IC chip further comprises a fingerprint identification circuit and the fingerprint identification circuit comprises at least one self-capacitance sensing circuit.

11. The fingerprint identification apparatus in claim 1, wherein the thin substrate has thickness between 10 to 100 micrometers.

12. A fingerprint identification apparatus comprising:
a fingerprint identification IC chip having a contact face and a plurality of metal bumps arranged on the contact face;
an intermediate layer having a first face, a second face opposite to the first face, a plurality of first metal pads arranged on the first face, a plurality of second metal pads arranged on the second face, and a plurality of metal pillars arranged within the intermediate layer,
wherein the first metal pads on the first face and the second metal pads on the second face are in one on one correspondence and electrically connected to each other by corresponding metal pillars, wherein at least part of the first metal pads on the first face of the intermediate layer electrically connected to the metal bumps;
a protection layer having a mounting face adjacent to the second face of the intermediate layer;
wherein the metal bumps, the first metal pads and the second metal pads are different electrodes, and are respectively arranged on three different layers;
wherein a separation between a bottom face of the fingerprint identification IC chip and the metal bumps is smaller than a separation between the bottom face of the fingerprint identification IC chip and the first metal pads; the separation between the bottom face of the fingerprint identification IC chip and the first metal pads is smaller than a separation between the bottom face of the fingerprint identification IC chip and the second metal pads.

13. The fingerprint identification apparatus in claim 12, further comprising:
a flexible circuit board electrically connected to the intermediate layer.

14. The fingerprint identification apparatus in claim 12, wherein the at least part of the first metal pads on the first face of the intermediate layer and the metal bumps of the fingerprint identification IC chip are in one by one correspondence with respect to their locations.

15. The fingerprint identification apparatus in claim 14, wherein the protection layer has a plurality of conductive electrodes on the mounting face, at least part of the second metal pads on the second face of the intermediate layer and the conductive electrodes are in one by one correspondence with respect to their locations.

16. The fingerprint identification apparatus in claim 14, wherein the fingerprint identification IC chip is pressed on the intermediate layer through anisotropic conductive film (ACF), or the fingerprint identification IC chip is pressure soldered on the intermediate layer through a low melting point metal material.

17. The fingerprint identification apparatus in claim 12, wherein the protection layer is a protection glass of a display.

18. The fingerprint identification apparatus in claim 12, wherein the protection layer is made from glass, ceramic, sapphire or polymer material.

19. The fingerprint identification apparatus in claim 12, wherein the fingerprint identification IC chip further comprises a fingerprint identification circuit and the fingerprint identification circuit comprises at least one self-capacitance sensing circuit.

20. The fingerprint identification apparatus in claim 12, wherein one end of the metal pillar is connected to one of the first metal pads on the first face and the other end of the metal pillar is connected to one of the second metal pads on the second face.

* * * * *